(12) United States Patent
Austin et al.

(10) Patent No.: US 8,305,653 B2
(45) Date of Patent: Nov. 6, 2012

(54) PRINTING SYSTEM WITH IMPROVED SCANNING FUNCTIONALITY

(75) Inventors: Paul R. Austin, Webster, NY (US); Nathaniel G. Martin, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 548 days.

(21) Appl. No.: 12/565,824

(22) Filed: Sep. 24, 2009

(65) Prior Publication Data
US 2011/0069357 A1    Mar. 24, 2011

(51) Int. Cl.
*H04N 1/04*    (2006.01)
(52) U.S. Cl. ....... 358/474; 358/487; 358/1.15; 358/1.12
(58) Field of Classification Search ................. 358/474, 358/487, 1.15, 1.12, 1.9, 1.18
See application file for complete search history.

(56) References Cited

U.S. PATENT DOCUMENTS

| 7,009,726 | B2 * | 3/2006 | Lumley | 358/1.15 |
| 7,302,116 | B2 | 11/2007 | Curry | |
| 7,383,494 | B2 | 6/2008 | Krolczyk | |
| 2008/0144069 | A1 | 6/2008 | Austin | |
| 2008/0252943 | A1 * | 10/2008 | Kozakura et al. | 358/474 |

* cited by examiner

*Primary Examiner* — Houshang Safaipour
(74) *Attorney, Agent, or Firm* — MH2 Technology Law Group LLP

(57) ABSTRACT

A method and system including a scanning subsystem for scanning a plurality of documents with a plurality of corresponding images is presented. The system further includes an image generation subsystem for automatically generating (1) a plurality of thumbnail images corresponding to the plurality of documents scanned with the scanner, and (2) a mark sense area corresponding to each one of the plurality of thumbnail images. A printing subsystem is included for producing at least one print including the plurality of thumbnail images and a plurality of mark sense areas. A thumbnail selection module is also included that causes at least one of the plurality of corresponding images to be replaced when both the at least one print with one or more marked mark sense areas and at least one of the plurality of documents are scanned with the scanning subsystem.

17 Claims, 4 Drawing Sheets

PRINTING SYSTEM WITH IMPROVED SCANNING FUNCTIONALITY

REFERENCE TO RELATED APPLICATIONS

This application is related to commonly-owned U.S. Pat. No. 7,383,494, issued on Jun. 3, 2008; the entire contents of this patent incorporated herein by reference. This application is also related to commonly-owned U.S. Pat. No. 7,302,116, issued on Nov. 27, 2007; the entire contents of this patent incorporated herein by reference. This application is also related to a commonly-owned patent application having the title "Method and Multi-Function Machine Having Capability of Generating and Printing Thumbnails Corresponding to Scanned Documents," filed on Dec. 14, 2006 and assigned patent application Ser. No. 11/638,718, now having U.S. Publication No. 2008/0144069; the entire contents of this patent application are incorporated herein by reference.

FIELD OF THE RELATED ART

The present disclosure relates to a printing system, and more particularly, to an approach for rescanning a document based on thumbnails corresponding to the document.

BACKGROUND OF THE RELATED ART

"Multi-function" machines or multifunction devices (MFDs) have become familiar in offices and in home computing environments. Whereas, previously, functions such as copying, printing, and facsimile transmission have been performed by single dedicated copiers, printers, and facsimiles respectively, a multi-function machine is typically capable of providing all such functions and more in a single machine. Typically, such a multi-function machine includes a single print engine, which can serve to output copies, prints, or received facsimiles; as well as a single input scanner which can serve to record data from original images for use in copying, facsimile transmission, and retention of input image data to a predetermined location in a computer memory. The scanner may also include a scan-to-email function (or a scan-to-file function) that enables the user to use a personal computer connected to the multi-function machine via a data network or a computer incorporated with the multi-function machine to execute, for example, an email editor or any other type of editor.

Conventional scan-to-file and scan-to-email functions provided on a host of multi-function machines typically scan documents without any problems. Occasionally, however, problems occur while scanning documents using the scan-to-file and scan-to-email functions. The problems may be due to a host of reasons, such as incorrect scan settings, skew in automatic document feeders, and document misfeeds. An operator or user of a multi-function machine typically does not realize that a problem occurred during scanning and proceeds subsequent to scanning the documents to save and/or email the images corresponding to the scanned documents.

SUMMARY

It is an aspect of the present disclosure to provide a system including a scanning subsystem for scanning a plurality of documents with a plurality of corresponding images; an image generation subsystem operatively associated with said scanning subsystem for automatically generating (1) a plurality of thumbnail images corresponding to the plurality of documents scanned with said scanner, and (2) a mark sense area located adjacent to each one of the plurality of thumbnail images; a printing subsystem for producing at least one print including the plurality of thumbnail images and a plurality of mark sense areas, wherein, subsequent to the producing, one or more of the mark sense areas are marked by a user; and a thumbnail selection module in operable communication with said scanning subsystem, wherein said thumbnail selection module causes at least one of the plurality of corresponding images to be replaced when both the at least one print with one or more marked mark sense areas and at least one of the plurality of documents are scanned with the scanning subsystem.

It is an another aspect of the present disclosure to provide a method including the steps of electronically scanning a plurality of documents with a plurality of corresponding images; automatically generating (1) a plurality of thumbnail images corresponding to the plurality of documents scanned pursuant to said scanning, and (2) a mark sense area located adjacent to each one of the plurality of thumbnail images; producing at least one print including the plurality of thumbnail images and a plurality of mark sense areas, wherein, subsequent to said producing, one or more of the mark sense areas are marked by a user; and electronically scanning both the at least one print with one or more marked mark sense areas and at least one of the plurality of documents for causing at least one of the plurality of corresponding images to be replaced.

It is an another aspect of the present disclosure to provide a printing system, including a scanning subsystem for scanning a plurality of documents with a plurality of corresponding images; an image generation subsystem operatively associated with said scanning subsystem for automatically generating (1) a plurality of thumbnail images corresponding to the plurality of documents scanned with said scanner, and (2) a symbol marking area located substantially within a boundary of each one of the plurality of thumbnail images; a printing subsystem for producing at least one print including the plurality of thumbnail images and a plurality of symbol marking areas, wherein, subsequent to the producing, one or more of the symbol marking areas are marked by a user; and a thumbnail selection module in operable communication with said scanning subsystem, wherein said thumbnail selection module causes at least one of the plurality of corresponding images to be replaced when both the at least one print with one or more symbol marking areas and at least one of the plurality of documents are scanned with the scanning subsystem.

The present disclosure also provides a computer-readable medium which stores programmable instructions configured for being executed by at least one processor for performing the methods described herein according to the present disclosure. The computer-readable medium can include flash memory, CD-ROM, a hard drive, etc.

BRIEF DESCRIPTION OF THE DRAWINGS

Various embodiments of the present disclosure will be described herein below with reference to the figures wherein.

DETAILED DESCRIPTION

Figure 1:
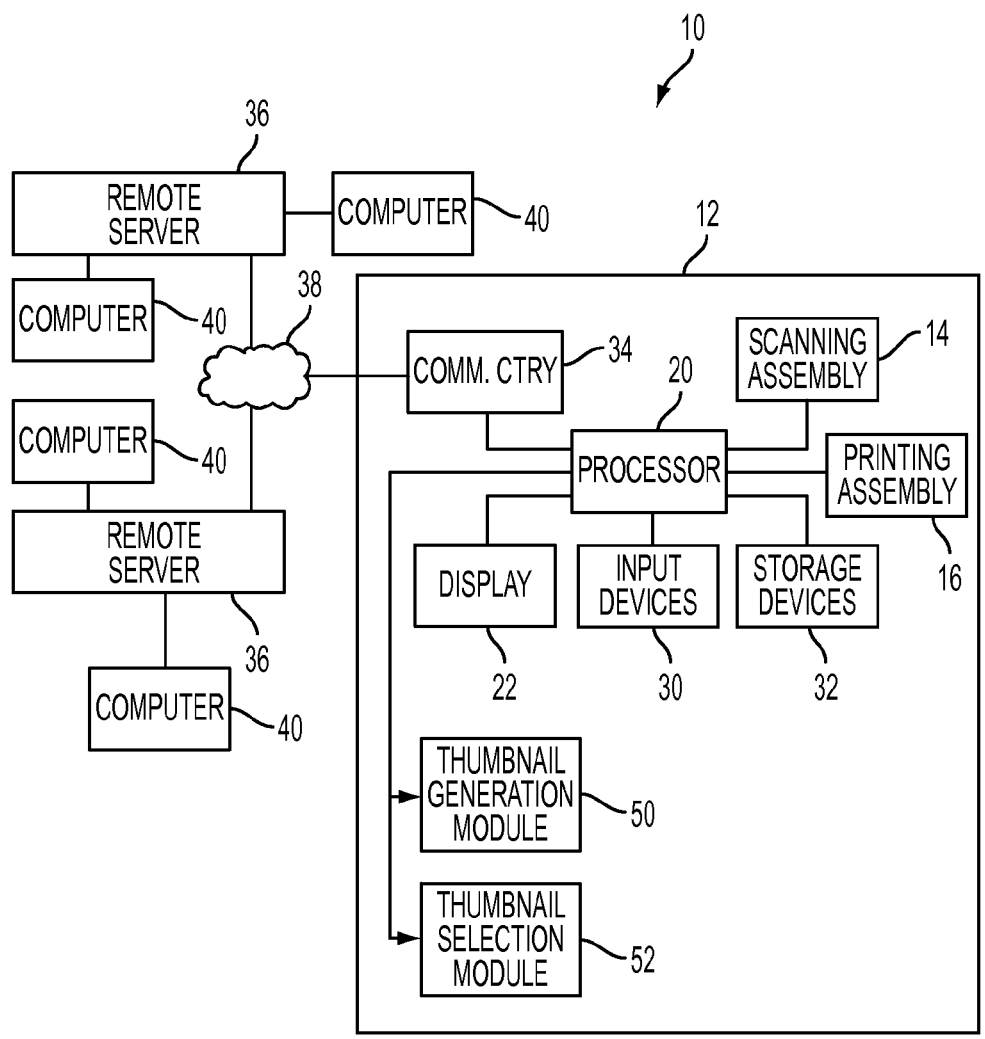
FIG. 1 is a block diagram of a system having a multi-function machine for generating, printing, and providing for the marking of one or more thumbnails corresponding to scanned documents, in accordance with the present disclosure.

The present disclosure provides a method and a multi-function machine having the capability of generating, printing, and providing for marking of thumbnails (also referred to as thumbnail images or reduced size images) corresponding to scanned documents.

In the present disclosure, the thumbnails are printed on one or more sheets by the multi-function machine during or following the completion of the scanning procedure in order for an operator to view the thumbnail corresponding to the scanned documents and determine which sheets, if any, have problems and should be rescanned. The operator may mark a mark sense box (or check box) provided adjacent to each thumbnail to indicate which thumbnails need to be rescanned, replaced, or discarded. The present disclosure further provides the operator with the option to rescan all the rejected thumbnails individually or provides the operator with the option to re-feed the entire set of pages and have the system skip over pages that do not require rescanning. The two options are performed in cooperation/conjunction with rescanning the marked list or sheet of thumbnails into the MFD.

Prior to describing the present disclosure in further detail, it will first be helpful to define various terms that will be used throughout the following discussion. For example:

The term "print" is overloaded to mean sending the document to the printer through any one of a multitude of ways. The term "print" can also refer to electronically sending a document to a touch-screen display as an output. The term "printing" can refer to enabling a hard-copy output of a document via any means. However, the term "printing" can also refer to displaying an output (e.g., a document) on a screen without providing for a hard-copy of the document. Moreover, the term "printer" can refer to any device that accepts text and graphic output from any type of computing device and transfers the information to any printable medium. A "printer" can refer to any type of xerographic, solid ink, liquid ink, cut sheet or web-based device used to print onto a wide array of printable media. The term "printer" as used herein encompasses any apparatus, such as a digital copier, book-making machine, facsimile machine, multi-function machine, etc. which performs a print outputting function for any purpose.

MFDs disclosed herein include both those that are "connected" and those that are "unconnected." An "unconnected" MFD does not have access to a network (e.g., the Internet). A "connected" MFD is normally connected via an Ethernet card or the like to a network. In the present embodiments, the MFD may be an unconnected MFD that is in operative communication with a wireless device, the wireless device being able to access a network. A connection between the multifunctional device and the wireless device is made through a two-way communication channel located on the multifunctional device.

The term "multi-function machine" or "MFD" can refer to any machine that connects to either a computing device and/or network and performs one or more of the following functions: print, scan, copy, and/or fax. Digital copiers, fax machines, printers, and scanner combinations are all examples of MFDs. The term "MFD" can further refer to any hardware that combines several functions in one unit. For instance, an MFD can be a standalone printer or any type of standalone machine/device/apparatus/component. For example, an MFD can be one or more personal computers (PCs), a standalone printer, a standalone scanner, a mobile phone, an MP3 player, audio electronics, video electronics, GPS systems, televisions, recording and/or reproducing media (such as CDs, DVDs, camcorders, cameras, etc.) or any other type of consumer or non-consumer analog and/or digital electronics. Such consumer and/or non-consumer electronics can apply in any type of entertainment, communications, home, and/or office capacity. Thus, the term "MFDs" can refer to any type of electronics suitable for use with a circuit board and intended to be used by a plurality of individuals for a variety of purposes. The terms "multi-function machine" and "MFD" can be used interchangeably throughout the specification.

The term "storage" can refer to data storage. "Data storage" can refer to any article or material (e.g., a hard disk) from which information is capable of being reproduced, with or without the aid of any other article or device. "Data storage" can refer to the holding of data in an electromagnetic form for access by a computer processor. Primary storage is data in random access memory (RAM) and other "built-in" devices. Secondary storage is data on hard disk, tapes, and other external devices. "Data storage" can also refer to the permanent holding place for digital data, until purposely erased. "Storage" implies a repository that retains its content without power. "Storage" mostly means magnetic disks, magnetic tapes and optical discs (CD, DVD, etc.). "Storage" may also refer to non-volatile memory chips such as flash, Read-Only memory (ROM) and/or Electrically Erasable Programmable Read-Only Memory (EEPROM).

As used herein, "print job" is not limited to a particular electronic format, such as a bitmap, but can include any suitable format including PDF, word processor formats, rich text (RTF), etc., as will be appreciated by those skilled in the art.

The term "task" refers to a print, scan, copy, and/or fax job or any type of function that may be performed by an MFD. The term "task" may also refer to an execution path through address space, such as a set of program instructions that are loaded in a data storage means. The term "task" may also refer to a basic unit of programming that an operating system controls and depending on how the operating system defines a task in its design, this unit of programming may be an entire program or each successive invocation of a program.

The term "module" may refer to a self-contained component (unit or item) that is used in combination with other components and/or a separate and distinct unit of hardware or software that may be used as a component in a system, such as a printing system including a plurality of MFDs. The term "module" may also refer to a self-contained assembly of electronic components and circuitry, such as a stage in a computer that is installed as a unit.

As further described below with reference to the figures, the multi-function machine is of the type having the capability of scanning, copying and electronically transmitting documents. The scanned documents can be electronically transmitted by email and/or by facsimile transmission protocols. The multi-function machine can be a xerographic multi-function machine.

With reference to FIG. 1, a block diagram of a system having a multi-function machine for generating, printing, and providing for marking of thumbnails corresponding to scanned documents, in accordance with the present disclosure is presented.

In FIG. 1, the system is designated generally by reference numeral 10 and the multi-function machine is designated generally by reference numeral 12. The documents are scanned by a scanning assembly 14 of the multi-function machine 12 during a document scanning procedure and the thumbnails are automatically printed on one or more sheets by a printing assembly 16 of the multi-function machine 12 during or following the completion of the document scanning procedure.

The multi-function machine 12 further includes a thumbnail generation module 50 having at least one of software, firmware and hardware for generating thumbnails corresponding to the scanned documents. In one embodiment, the thumbnail generation module 50 includes a print thumbnails software program having a set of programmable instructions configured for execution by at least one processor 20 of the multi-function machine 12 for generating the thumbnails corresponding to the documents scanned during the document scanning procedure by the scanning assembly 14 of the multi-function machine 12 for printing by the printing assembly 16 of the multi-function machine 12.

The thumbnails are transmitted to the printing assembly 16 following the completion of the document scanning procedure or during the document scanning procedure. As such, the printing assembly 16 is configured to print the thumbnails after completion of the document scanning procedure or during the document scanning procedure without the multi-function machine 12 receiving a user input.

The completion of the document scanning procedure is sensed or determined by the at least one processor 20 receiving a signal from a document sensor provided in proximity to a document feed assembly of the multi-function machine 12. The sensor senses the presence of a document inserted within the document feed assembly. When the sensor does not sense the document following actuation of a document scanning procedure, it transmits a signal to the at least one processor 20 informing the at least one processor 20 that there are no additional documents to be scanned.

The multi-function machine 12 further includes a thumbnail selection module 52 having at least one of software, firmware and hardware for selecting thumbnails corresponding to the scanned documents. In one embodiment, the thumbnail selection module 50 includes a method of augmenting a thumbnail sheet (or list of thumbnails 60, described below with reference to FIG. 2) with mark sense boxes that permit the operator to delete or replace pages that, for example, scanned incorrectly so that the scan quality is assured while the original pages are readily available.

Thus, in accordance with the present disclosure, and in cooperation with the thumbnail selection module 52, the operator may simply check boxes adjacent to images/thumbnails in order to indicate that images/thumbnails should either be removed or replaced. Sheets/pages that are to be inserted or rescanned are stacked under the thumbnail sheet in the order in which they appear, and then the entire stack is scanned. When the thumbnails sheet is rescanned, the operator's handwritten marks are detected and used to guide the deletion or replacement of images. This enables quality control intervention while still at the MFD, which is faster and less costly than known alternatives.

In summary, in accordance with the present disclosure, and in accordance with the modules 50, 52, a user creates an image set from the scanned documents and prints a thumbnail page of the image set where each thumbnail image is associated with checkboxes for insert, delete, and rescan. Then the user scans the thumbnail page and possibly several paper documents and processes the image set in accordance with the instructions on the thumbnail page.

To create an image set and thumbnail page, the thumbnail generation module creates images of all of the documents scanned and composes them into a set (e.g., multi-page TIFF). The thumbnail generation module then stores the image set in a location accessible to the MFD and then creates a thumbnail page of the set of images that contains, for example, two mark recognition boxes labeled "delete" and "rescan" associated with each of the images/thumbnails. This page also contains machine readable marks (e.g., bar codes or glyphs) that associate the page with the image set. The thumbnail generation module then uses the MFD to print the thumbnail page. The user inspects the thumbnail page to decide what to do with the images/thumbnails. The user then loads the document feeder with the printed thumbnail page and the documents that need to be rescanned.

To process the thumbnail page and image set, the user needs to image the thumbnail page, create images of each of the paper documents following the thumbnail page, interpret the machine readable marks on the thumbnail page to determine the image set associated with this thumbnail page, retrieve the image set associated with the thumbnail page, and then process the image set according to the annotation in the checkboxes on the thumbnail sheet. The thumbnail selection module does this for the user.

For example, (i) if the delete checkbox is marked, the thumbnail selection module may remove the image associated with the location of the page in the image set, (ii) if the rescan checkbox is marked, the thumbnail selection module may remove the image associated with the location of the page in the image set and insert the image newly captured, and (iii) if the insert box is marked, the thumbnail selection module may interpret the mark that indicates the number of pages to insert and insert that number of images newly captured. Additionally, the thumbnail selection module may then store the new image set in a location accessible to the MFD/multi-function machine and create and print a new thumbnail sheet based on the altered image set.

Figure 2:
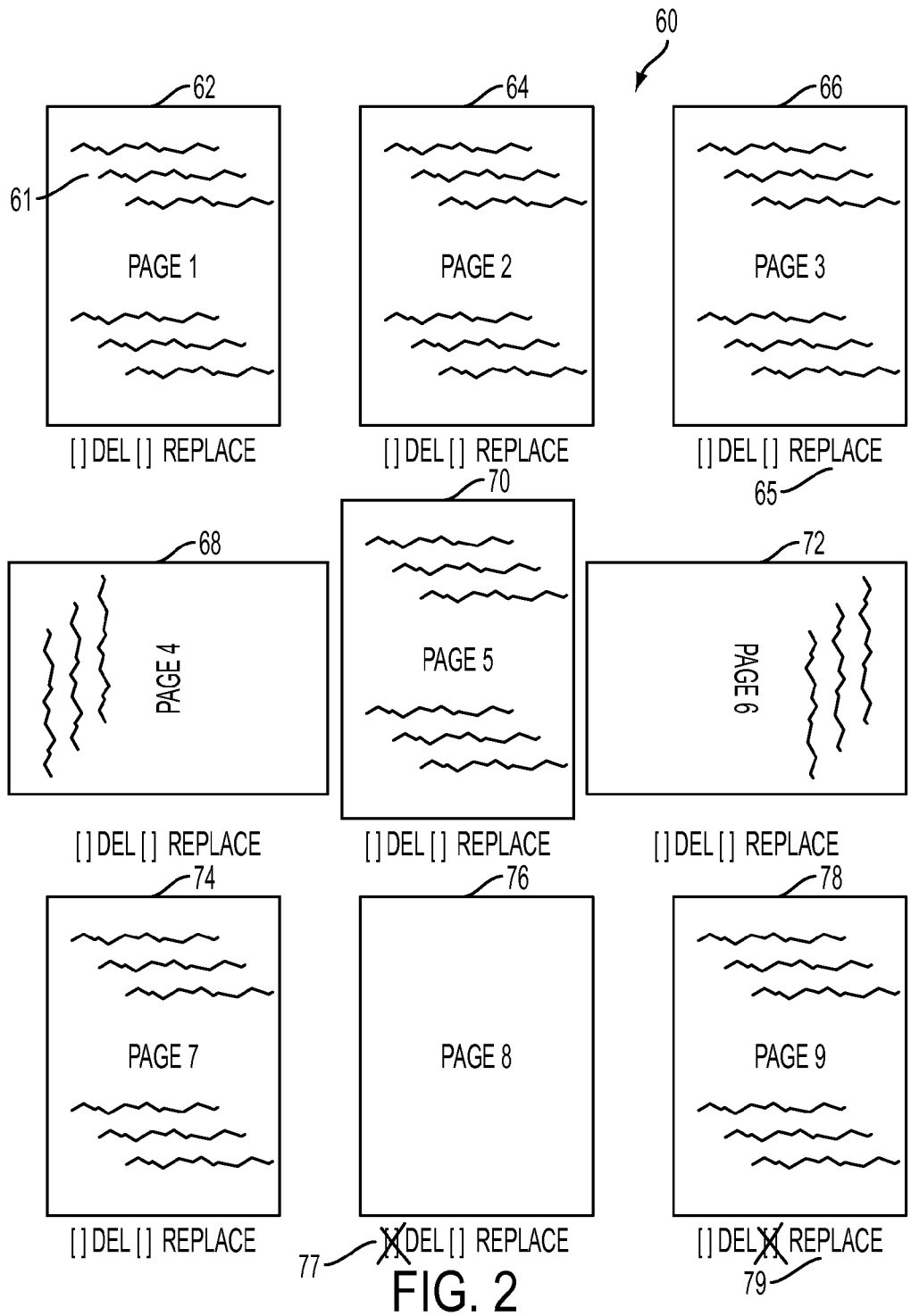
FIG. 2 is an enlarged view of a sheet having one or more thumbnails corresponding to scanned documents each having a marked sense box to allow a user to delete or replace one or more thumbnails, in accordance with the present disclosure.

With reference to FIG. 2, a sheet having thumbnails corresponding to scanned documents each having a marked sense box to allow a user to delete or replace one or more thumbnails, in accordance with the present disclosure is presented.

The list of thumbnails 60 includes a first thumbnail 62, a second thumbnail 64, a third thumbnail 66, a fourth thumbnail 68, a fifth thumbnail 70, a sixth thumbnail 72, a seventh thumbnail 74, an eighth thumbnail 76, and a ninth thumbnail 78. Each of the thumbnails 62, 64, 66, 68, 70, 72, 74, 76, 78 includes one or more mark sense boxes 65. The mark sense boxes 65 may include a check box for deletion of a scan job and a check box for replacement of a scan job. The user may perform either task or a number of other tasks contemplated by one skilled in the art. Also, thumbnails 62, 64, 66, 68, 70, 72, 74, and 78 also include text 61. Thumbnail 76 includes mark 77 and thumbnail 78 includes mark 79.

As illustrated in FIG. 2, the fourth thumbnail 68, the sixth thumbnail 72, and the eighth thumbnail 76 have not been scanned properly. For example, the fourth thumbnail 68 and the sixth thumbnail 72 show that such pages have been scanned sideways, whereas the eighth thumbnail 76 indicates that this page is blank (it has no text). The user may select the replace check box 79 of the mark sense boxes 65 to indicate that such document/page should be rescanned or may select the delete check box 77 to indicate that such document/page should be deleted. Once the thumbnails 68, 72, 76 are marked, the user can rescan the marked sheets or marked list of thumbnails into the MFD in conjunction with original documents in order to guide the MFD in creating a defect-free scan.

Referring back to FIG. 1, in an alternate embodiment, the functions of generating and selecting the thumbnails can be performed by incorporating within the modules 50, 52 or connecting to the multi-function machine 12 a reduced size image generator (not shown). The generator generates the thumbnails in a format suitable for printing. The thumbnails are transmitted by the modules 50, 52 via the at least one processor 20 to the printing assembly 16 to be printed.

The thumbnail generation and selection modules 50, 52 can also include additional programmable instructions (i.e., software), firmware and/or hardware for enabling the multi-function machine 12 to perform other functions, such as analyzing the generated thumbnails or other images corresponding to the scanned documents for characteristics indicative of skewing problems, improper scan settings (such as contrast, size, incorrect paper selection, etc.), etc., and alerting the operator accordingly by displaying a message on a display device 22 of the multi-function machine.

Additionally or alternatively, the modules 50, 52 can include software, firmware and/or hardware for performing the function or having the at least one processor 20 perform the function of generating annotation which are overlaid over one or more of the corresponding thumbnails 62, 64, 66, 68 during printing by the printing assembly 16. The annotations can also be printed in proximity to the printed thumbnails 62, 64, 66, 68 on the list of thumbnails 60. The annotations can indicate possible scanning problems, incorrect operator settings, etc. for quickly informing the operator.

Additionally or alternatively, the modules 50, 52 can be programmed for enabling the operator to change the number of thumbnails 62, 64, 66, 68 printed on the list of thumbnails 60, to change the thumbnail printing format.

Additionally or alternatively, the modules 50, 52 can include software, firmware and/or hardware for image processing the scanned documents. This includes enabling the modules 50, 52 to analyze the images corresponding to the scanned documents to automatically detect and correct skewing errors, detect and correct color variations, detect and correct contrast errors, detect and correct redeye, etc.

The at least one processor 20 of the multi-function machine 12 besides being in operable communication with the scanning and printing assemblies 14, 16, and the display device 22, it is further in operable communication with one or more input devices 30, such as a keypad and control panel; one or more external storage devices 32, such as a database; and communication circuitry 34 for enabling the multi-function machine 12 to receive and transmit messages from and to one or more remote servers 36 via a communications network 38, such as the Internet. The one or more servers 36 are linked to a plurality of computers or terminals 40 as known in the art.

Figure 3:
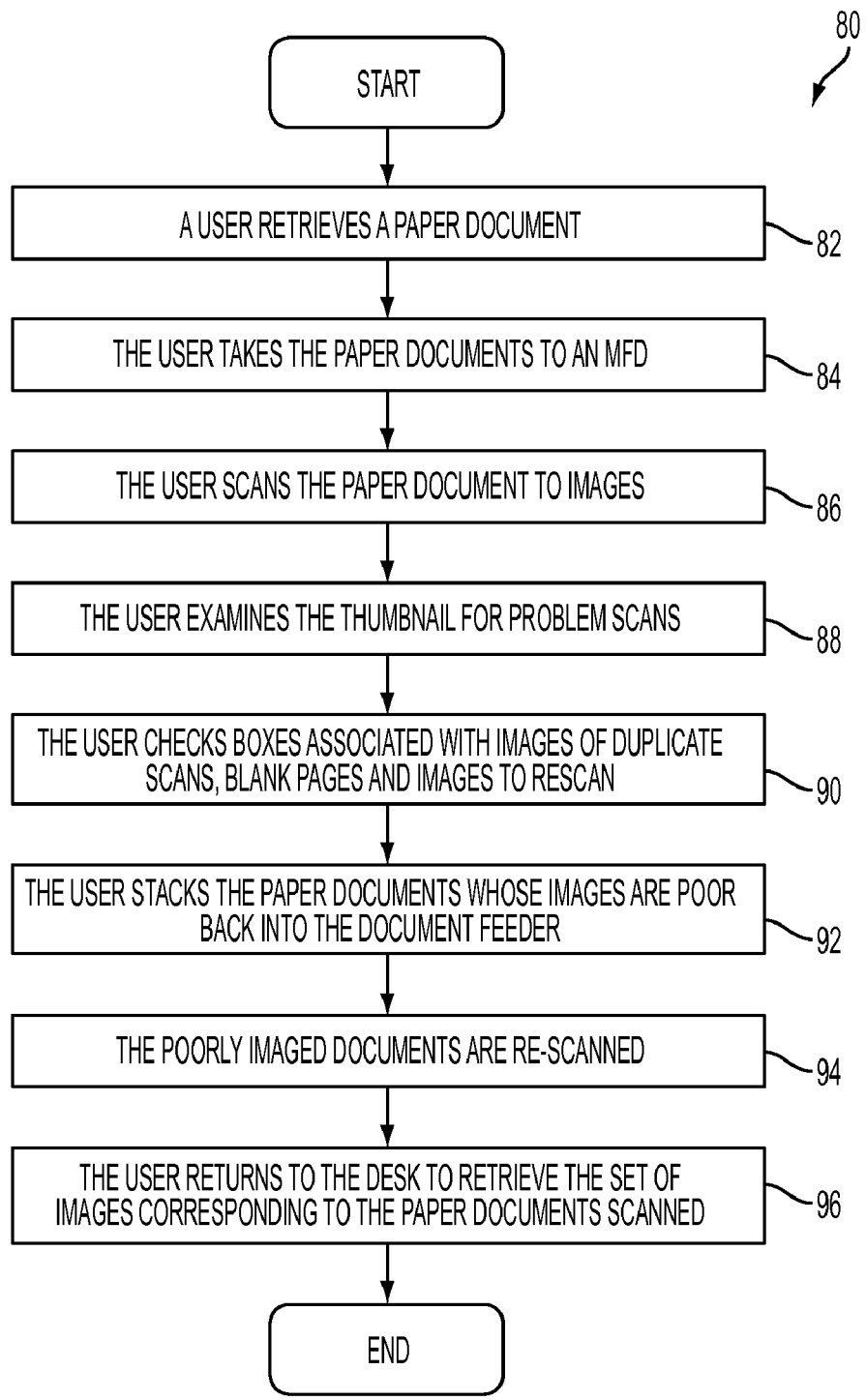
FIG. 3 is a flowchart of a method for generating, printing, and providing for the marking of one or more thumbnails corresponding to scanned documents, in accordance with the present disclosure.

With reference to FIG. 3, there is shown a flowchart of a method for generating, printing, and providing for marking of thumbnails corresponding to scanned documents, in accordance with the present disclosure.

The flowchart 80 includes the following steps. In step 82, a user retrieves a paper document. In step 84, a user takes the paper document to an MFD. In step 86, the user scans the paper document to images (e.g., thumbnails). In step 88, the user examines the thumbnails for any potential problems resulting from the scan. In step 90, the user checks boxes associated with images of duplicate scans, blank pages, and images that need to be rescanned. Additionally, the box associated with the image of the document preceding (or following) the location of missing scans may be marked with an annotation that indicates the number of missing pages. In step 92, the user stacks the paper documents whose images are poor back into the document feeder. In step 94, the poorly imaged documents are rescanned in conjunction with the marked list of thumbnails. In step 96, the user returns to the desk to retrieve the set of images corresponding to the paper documents scanned. The process then ends.

Figure 4:
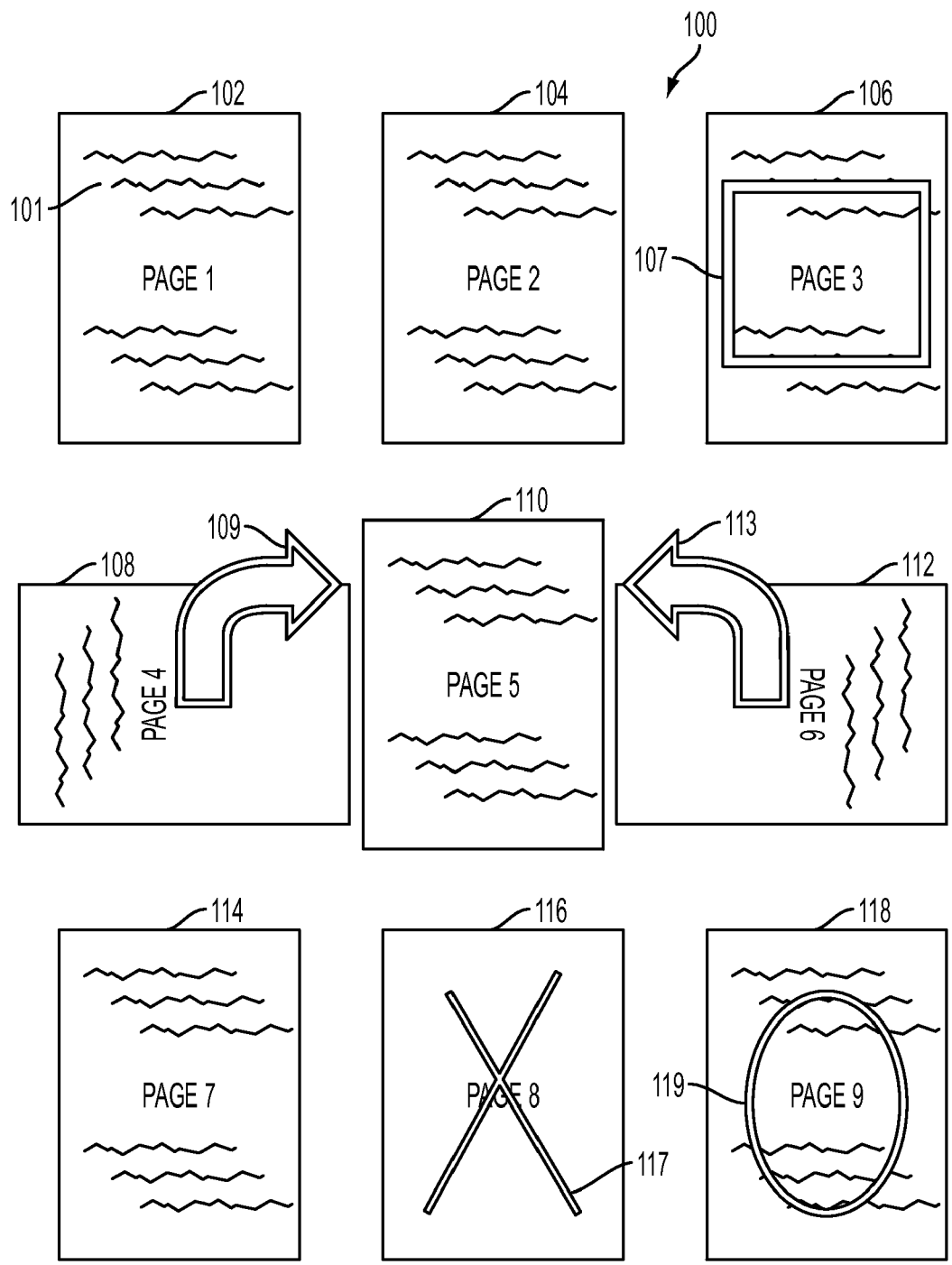
FIG. 4 is an enlarged view of a sheet having one or more thumbnails corresponding to scanned documents, the one or more thumbnails marked with a symbol of contrasting color to indicate a correction is in order, in accordance with the present disclosure.

With reference to FIG. 4, there is shown an enlarged view of a sheet having one or more thumbnails corresponding to scanned documents, the one or more thumbnails marked with a symbol of contrasting color to indicate a correction is in order, in accordance with the present disclosure.

The list of thumbnails 100 includes a first thumbnail 102, a second thumbnail 104, a third thumbnail 106, a fourth thumbnail 108, a fifth thumbnail 110, a sixth thumbnail 112, a seventh thumbnail 114, an eighth thumbnail 116, and a ninth thumbnail 118. In contrast to FIG. 2, each of the thumbnails 102, 104, 106, 108, 110, 112, 114, 116, 118 does not include one or more mark sense boxes. Instead of using mark sense boxes, the user may mark the thumbnail itself with a fixed set of symbols in a contrasting color.

For example, the third thumbnail 106 has been marked with a solid box 107 to indicate that such page should be cropped. The fourth thumbnail 108 has been marked with a thick left arrow to indicate that such page needs to be rotated. The sixth thumbnail 112 has been marked with a thick right arrow to indicate that such page needs to be rotated. The eighth thumbnail 116 has been marked with an "X" to indicate that such page needs to be deleted. The ninth thumbnail 118 has been marked with a "O" to indicate that such page needs to be replaced. One skilled in the art can envision a plurality of different symbols used to indicate a myriad of commands. Once the thumbnails 106, 108, 112, 116, 118 are marked, the user can rescan the marked sheets or marked list of thumbnails into the MFD in conjunction with original documents in order to guide the MFD in creating a defect-free scan.

The multi-function machine according to the present disclosure includes a print thumbnails software program having a set of programmable instructions. The multi-function machine further includes at least one processor for executing the set of programmable instructions of the print thumbnails software program for performing the functions of generating thumbnails corresponding to scanned documents for printing in accordance with the present disclosure. The thumbnails are printed by a printing assembly of the multi-function machine during or following the completion of the document scanning procedure.

The print thumbnails software program can be packaged and distributed as a software package for downloading to the multi-function machine where the set of programmable instructions are stored within at least one computer-readable medium, such as a CD-ROM, diskette, etc. The print thumbnails software program can also be downloaded to the multi-function machine through a network connection connecting the multi-function machine to a remote computer station, such as a remote server.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A printing system, comprising:
a scanning subsystem for scanning a plurality of documents with a plurality of corresponding images;
an image generation subsystem operatively associated with said scanning subsystem for automatically generating (1) a plurality of thumbnail images corresponding to the plurality of documents and (2) a mark sense area located adjacent to each one of the plurality of thumbnail images;
a printing subsystem for producing at least one print including the plurality of thumbnail images and a plurality of mark sense areas, wherein, subsequent to the producing, one or more of the mark sense areas are marked by a user; and
a thumbnail selection module in operable communication with said scanning subsystem, wherein said thumbnail selection module causes at least one of the plurality of corresponding images to be replaced when both the at least one print with one or more marked mark sense areas and at least one of the plurality of documents are scanned with the scanning subsystem,
wherein the thumbnail selection module includes a set of instructions that are executed by a processor for analyzing the plurality of thumbnail images for characteristics indicative of at least one of a skewing problem or an improper scan setting.

2. The printing system according to claim 1, wherein each mark sense area comprises a mark sense box that is checkable by the user so the at least one of the plurality of corresponding images is automatically replaced in response to scanning one or more checks with said scanning subsystem.

3. The printing system according to claim 1, wherein the at least one print includes a user annotation, and the printing system minimizes, based on the user annotation, scanning defects associated with scanning both the at least one print with one or more marked mark sense areas and at least one of the plurality of documents.

4. The printing system according to claim 1, wherein said thumbnail selection module includes a set of instructions, and wherein one or more of the set of instructions are executed with a processor for generating the thumbnail images.

5. The printing system according to claim 1, further comprising a programmable thumbnail generation module for enabling an adjustment of at least one of a number of thumbnails printed on the at least one print or a format of the at least one print.

6. A method of reproducing documents with a printing system, comprising:
electronically scanning a plurality of documents with a plurality of corresponding images;
automatically generating (1) a plurality of thumbnail images corresponding to the plurality of documents and (2) a mark sense area located adjacent to each one of the plurality of thumbnail images;
analyzing the plurality of thumbnail images for characteristics indicative of at least one of a skewing problem or an improper scan setting;
producing at least one print including the plurality of thumbnail images and a plurality of mark sense areas, wherein, subsequent to said producing, one or more of the mark sense areas are marked by a user; and
electronically scanning both the at least one print with one or more marked mark sense areas and at least one of the plurality of documents for causing at least one of the plurality of corresponding images to be replaced.

7. The method according to claim 6, wherein each mark sense area comprises a mark sense box that is checkable by the user, further comprising:
automatically replacing at least one of the plurality of corresponding images in response to electronically scanning one or more checked mark sense boxes.

8. The method according to claim 6, wherein the at least one print includes a user annotation, further comprising:
minimizing, based on the user annotation, scanning defects associated with scanning both the at least one print with one or more marked mark sense areas and at least one of the plurality of documents.

9. The method according to claim 6, further comprising executing one or more of a set of instructions with a processor for generating the thumbnail images.

10. The method according to claim 6, further comprising enabling an adjustment of at least one of a number of thumbnails printed on the at least one print or a format of the at least one print.

11. A system for reproducing documents, the system comprising:
a computing device;
a computer-readable storage medium in communication with the computing device, the computer-readable storage medium comprising one or more programming instructions for:
electronically scanning a plurality of documents with a plurality of corresponding images;
automatically generating (1) a plurality of thumbnail images corresponding to the plurality of documents and (2) a mark sense area located adjacent to each one of the plurality of thumbnail images;
analyzing the plurality of thumbnail images for characteristics indicative of at least one of a skewing problem or an improper scan setting;
producing at least one print including the plurality of thumbnail images and a plurality of mark sense areas, wherein, subsequent to said producing, one or more of the mark sense areas are marked by a user; and
electronically scanning both the at least one print with one or more marked mark sense areas and at least one of the plurality of documents for causing at least one of the plurality of corresponding images to be replaced.

12. The system according to claim 11, wherein each mark sense area comprises a mark sense box that is checkable by the user so the at least one of the plurality of corresponding images is automatically replaced in response to scanning one or more checks with said scanning subsystem.

13. The system according to claim 11, wherein the at least one print includes a user annotation, and wherein the printing system minimizes, based on the user annotation, scanning defects associated with scanning both the at least one print with one or more marked mark sense areas and at least one of the plurality of documents.

14. The system according to claim 11, wherein the computer-readable storage medium further comprises programming instructions for generating the plurality of thumbnail images.

15. The system according to claim 11, wherein the computer-readable storage medium further comprises programming instructions for enabling an adjustment of at least one of a number of thumbnails printed on the at least one print or a format of the at least one print.

16. A printing system, comprising:

a scanning subsystem for scanning a plurality of documents with a plurality of corresponding images;

an image generation subsystem operatively associated with said scanning subsystem for automatically generating (1) a plurality of thumbnail images corresponding to the plurality of documents, and (2) a plurality of symbol marking areas corresponding to the plurality of thumbnail images, wherein each of the plurality of symbol marking areas substantially overlaps a corresponding thumbnail image of the plurality of thumbnail images;

a printing subsystem for producing at least one print including the plurality of thumbnail images and the plurality of symbol marking areas, wherein, subsequent to the producing, one or more of the symbol marking areas are marked by a user; and a thumbnail selection module in operable communication with said scanning subsystem, wherein said thumbnail selection module causes at least one of the plurality of corresponding images to be modified when both the at least one print with one or more symbol marking areas and at least one of the plurality of documents are scanned with the scanning subsystem.

17. The printing system according to claim 16, wherein one or more of the plurality of symbol marking areas are marked with predetermined symbols inserted by the user so the at least one of the plurality of corresponding images is automatically modified in response to scanning the predetermined symbols.

* * * * *